United States Patent [19]

Arnold

[11] Patent Number: 5,298,167
[45] Date of Patent: Mar. 29, 1994

[54] METHOD FOR SEPARATING IMMISCIBLE LIQUID

[76] Inventor: Kenneth E. Arnold, 3031 Shadowdale, Houston, Tex. 77043

[21] Appl. No.: 988,660

[22] Filed: Dec. 10, 1992

[51] Int. Cl.$^5$ .............................................. C02F 1/24
[52] U.S. Cl. .................................... 210/703; 210/708; 210/741; 210/744; 210/787; 210/804
[58] Field of Search ............... 210/741, 703, 704, 787, 210/788, 804, 708, 744

[56] References Cited

U.S. PATENT DOCUMENTS

| | | | |
|---|---|---|---|
| 3,557,956 | 1/1971 | Braun et al. | 210/788 |
| 3,759,324 | 9/1973 | Mecusker | 166/75 |
| 3,764,008 | 10/1973 | Darley et al. | 210/73 |
| 4,190,523 | 2/1980 | Niemeijer et al. | 209/211 |
| 4,210,430 | 7/1980 | Galow et al. | 55/344 |
| 4,482,459 | 11/1984 | Shiver | 210/639 |
| 4,627,922 | 12/1986 | Viator et al. | 210/704 |
| 4,720,431 | 1/1988 | Arnold | 210/262 |
| 4,783,272 | 11/1988 | Patterson | 210/804 |
| 4,790,947 | 12/1988 | Arnold | 210/801 |
| 4,816,165 | 3/1989 | Carroll et al. | 210/788 |
| 4,844,812 | 7/1989 | Haynes et al. | 210/787 |
| 4,844,817 | 7/1989 | Flanigan et al. | 210/788 |
| 4,935,154 | 6/1989 | Arnold | 210/787 |
| 4,983,287 | 1/1991 | Arnold | 210/259 |
| 5,021,165 | 6/1991 | Kalnins | 210/703 |

FOREIGN PATENT DOCUMENTS

| | | | |
|---|---|---|---|
| 8400151 | 2/1985 | Australia | E21B 43/34 |
| WO92/19347 | 11/1992 | PCT Int'l Appl. | 210/787 |
| 1143437A | 3/1985 | U.S.S.R. | B01D 17/038 |
| 2000052A | 1/1979 | United Kingdom | B03D 1/02 |
| 2094185A | 9/1982 | United Kingdom | B04C 5/269/00 |
| 2101504A | 1/1983 | United Kingdom | B2P/ 5 10C2 |
| 2162092A | 1/1986 | United Kingdom | B03D 1/24 |
| 2190310A | 11/1987 | United Kingdom | B03B 1/04 |
| 2191424A | 12/1987 | United Kingdom | B04C 9/00 |

OTHER PUBLICATIONS

Smyth, I. C., et al., "Small-Scale Experiments on Hydrocyclones for De-Watering Light Oils," *International Conference on Hydrocyclones*, Paper 14, Oct. 1-3, 1980, Churchill College, Cambridge U.K. in conjunction with BHRH, The Fluid Engineering Center, Cranfield, Bedford, MK43 OAJ, England.

Arnold, Kenneth E., "Design Concepts for Offshore Produced Water Treating and Disposal Systems," *Journal of Petroleum Technology*, Feb. 1983, pp. 276-283.

Smyth, I. C., et al., "The Effect of Split Ratio on Heavy Dispersion Liquid-Liquid Separation in Hydrocyclones," *2nd International Conference on Hydrocyclones*, Paper E2, Sep. 19-21, 1984, Bath University, Bath England, in conjunction with BHRH, The Fluid Engineering Center, Cranfield, Bedford, MK43 OAJ, England.

Arnold, Ken, "Design of Oil-Handling Systems and Facilities," in *Surface Production Operations*, Gulf Publishing Co., Houston, Texas, vol. 1, pp. 185-208 (1986).

Primary Examiner—Peter A. Hruskoci
Attorney, Agent, or Firm—Marcella D. Watkins; William E. Shull

[57] ABSTRACT

An apparatus and a method are disclosed for separating a first fluid from a second fluid wherein the first fluid is lighter than the second fluid and the first fluid is immiscible with the second fluid. A first portion of the first fluid is separated from a mixture containing the first and second fluids in a gravity separator. The remaining mixture flows to a hydrocyclone where a second portion of the first fluid is separated from the remaining mixture. The underflow from the hydrocyclone which includes most of the second fluid and the remaining portion of the first fluid flows to a second gravity separator without substantial pressure reduction to avoid shearing of the droplets of the first fluid. In the second gravity separator a third portion of the first fluid is removed.

10 Claims, 5 Drawing Sheets 5,298,167

METHOD FOR SEPARATING IMMISCIBLE LIQUID

TECHNICAL FIELD OF THE INVENTION

The present invention relates to liquid/liquid seperation, and, more particularly, to an apparatus and a method for the separation of two liquids which are immiscible with each other. Still more particularly, the present invention discloses a method and an apparatus for separating oil from water efficiently by applying a separating influence and minimizing other factors which tend to reduce droplet size and inhibit separation.

BACKGROUND OF THE INVENTION

Separating oil and water in oil/water mixtures is often desirable. Furthermore, since the implementation of environmental and water-quality regulations, it is often necessary to achieve reduction of oil concentration to less than 50 ppm. There are presently several separation systems available for separating oil from water.

One simple separator system comprises a settling basin in which oil and water separate over time by gravity due to their density differences. The degree of separation is directly related to residence time in the basin.

Another method which is known as floatation uses the buoyancy of gas bubbles rising through the liquid to "float" contaminants, such as oil droplets, to the surface. The gas bubbles may be formed by the bubbling out of dissolved gas that occurs when pressure on the system is reduced or by injecting or dispersing gas into the water by a bubbling device.

Hydrocyclones are known separation devices which use a centrifugal effect to enhance separation. One design of a hydrocyclone comprises a long, funnel-shaped chamber into which a feed line is tangentially directed. An oil and water mixture under pressure is directed tangentially into the funnel-shaped separation chamber of a hydrocyclone via the feed line whereupon its energy is converted to angular momentum as the mixture swirls around the inside of the chamber. The swirling causes the less dense portion of the mixture (the oil) to move towards the axis of the device while the more dense portion (the water) is urged to the outside.

A typical hydrocyclone has a coaxial overflow outlet in its large end for providing an outlet for less dense phase from the hydrocyclone, and a coaxial underflow outlet, at the opposite end, for providing an outlet for the more dense phase from the hydrocyclone. The pressure difference between the overflow outlet and the underflow outlet, and the inlet flow rate determine the relative volumes of the overflow and underflow streams. Increasing the pressure at either outlet causes the flow through the opposite end to increase.

A predetermined degree of separation for a particular feed is achieved by providing a high enough velocity to create sufficient centrigual force and by setting the relative volumes of the overflow and underflow. The pressure differential between inlet pressure and overflow pressure necessary to achieve sufficient overflow rate in a given hydrocyclone at a given inlet flowrate can be calculated. The pressure at the underflow outlet must be greater than the pressure at the overflow outlet to provide sufficient overflow rate.

It has been demonstrated that the oil droplets that remain in the water underflow of a hydrocyclone are coalesced to droplets having a large size by the action of the hydrocyclone. Because the larger droplets settle out of the water at a higher velocity than the smaller droplets, it is easier to separate in a skim vessel the oil remaining in the hydrocyclone underflow from the water than it is to separate the smaller oil droplets from the water in the inlet stream.

U.S. Pat. No. 5,021,165 discloses a system having separator vessels and a hydrocyclone for separating oil from water that includes a pressure reducing device immediately downstream of the hydrocyclone. The pressure reducing device allows the necessary pressure to be maintained at the underflow outlet while providing a reduction of pressure to vaporize part of the stream to "float" oil droplets in a flotation unit downstream of the hydrocyclone. The passage of the fluid through the pressure reducing device, however, causes shearing of the oil droplets in the water thereby significantly decreasing the efficiency of the flotation unit.

In any mixture of immiscible fluids, because the kinetic energy of the mixture contributes both to dispersion of larger droplets and coalescence of smaller droplets, at any given energy input rate there is a statistically defined maximum droplet size for which the rates of dispersion and coalescence are equal. Maximum droplet size is inversely related to the energy input rate of the system. It is also known that a rapid decrease in pressure results in shear forces on the mixture causing shearing of oil droplets larger than a certain diameter. Hence, to maintain the large droplets developed by coalescence in the hydrocyclone, it is desirable to minimize the pressure drop to which the mixture is subjected.

One disadvantage of the prior art is that the use of pressure reduction to effect flotation causes a decrease in the efficiency of the separation for the reasons stated above. According to the present invention, a mixture comprising at least two immiscible liquids is processed through a system to separate the liquids by avoiding pressure reduction except for the pressure reduction in the hydrocyclone itself. The avoidance of the pressure reduction reduces the difficulties in shearing caused by such reduction in the prior art.

These and other objects and advantages of the present invention will be apparent from the following description.

SUMMARY OF THE INVENTION

An apparatus for separating at least two immiscible liquids having different densities in a mixture includes a surge vessel, a primary separator having a light liquid outlet and a heavy liquid outlet, a hydrocyclone having a light liquid overflow and a heavy liquid underflow, a secondary separator having a light liquid outlet and a heavy liquid outlet, and a pump for pumping the mixture from the surge vessel to the primary separator. The primary separator removes a portion of the light liquid from the mixture by gravity separation. The remaining mixture flows through the heavy liquid outlet to the hydrocyclone which further removes light liquid from the mixture via the light liquid overflow. The remaining mixture flows via the heavy liquid underflow to the secondary separator without reducing the pressure thereof where more light liquid is separated from the heavy liquid via gravity separation. The pressure in the secondary separator is maintained above the pressure of the light liquid overflow of the hydrocyclone by a gas blanket. Heavy liquid from the secondary separator may be recycled to the surge vessel to maintain a steady state.

In an alternative embodiment, the secondary separator is removed and is replaced with a back pressure valve to allow for the operation of the hydrocyclone at the desired pressure. Heavy liquid from the hydrocyclone underflow may be recirculated to the surge vessel to maintain steady state.

In another alternative embodiment, a gas is injected downstream of the pump and upstream of the primary separator of the first embodiment. In that case, flotation is effected without unnecessary pressure drops in the system.

In still another alternative embodiment of the present invention, the apparatus includes a primary separator, a hydrocyclone and a secondary separator in sequence as in the first embodiment. A gas blanket is provided in the primary separator to maintain constant pressure therein and the secondary separator is maintained at the pressure of the hydrocyclone underflow.

BRIEF DESCRIPTION OF THE DRAWINGS

For a detailed description of the preferred embodiments of the invention, reference will now be made to the accompanying drawings wherein.

DESCRIPTION OF THE PREFERRED EMBODIMENT

According to the present invention an apparatus and a method are disclosed for separating at least two immiscible fluids, such as oil and water, efficiently. The method utilizes at least one separator vessel and a hydrocyclone for separating the lighter fluid from the heavier fluid and avoids pressure drops in the system other than the pressure drop required in the hydrocyclone and the usual hydraulic pressure drop in the system. The avoidance of other pressure drops allows for the optimum use of the coalescence that occurs in the system so that a rapid, efficient separation is achieved.

Figure 1:
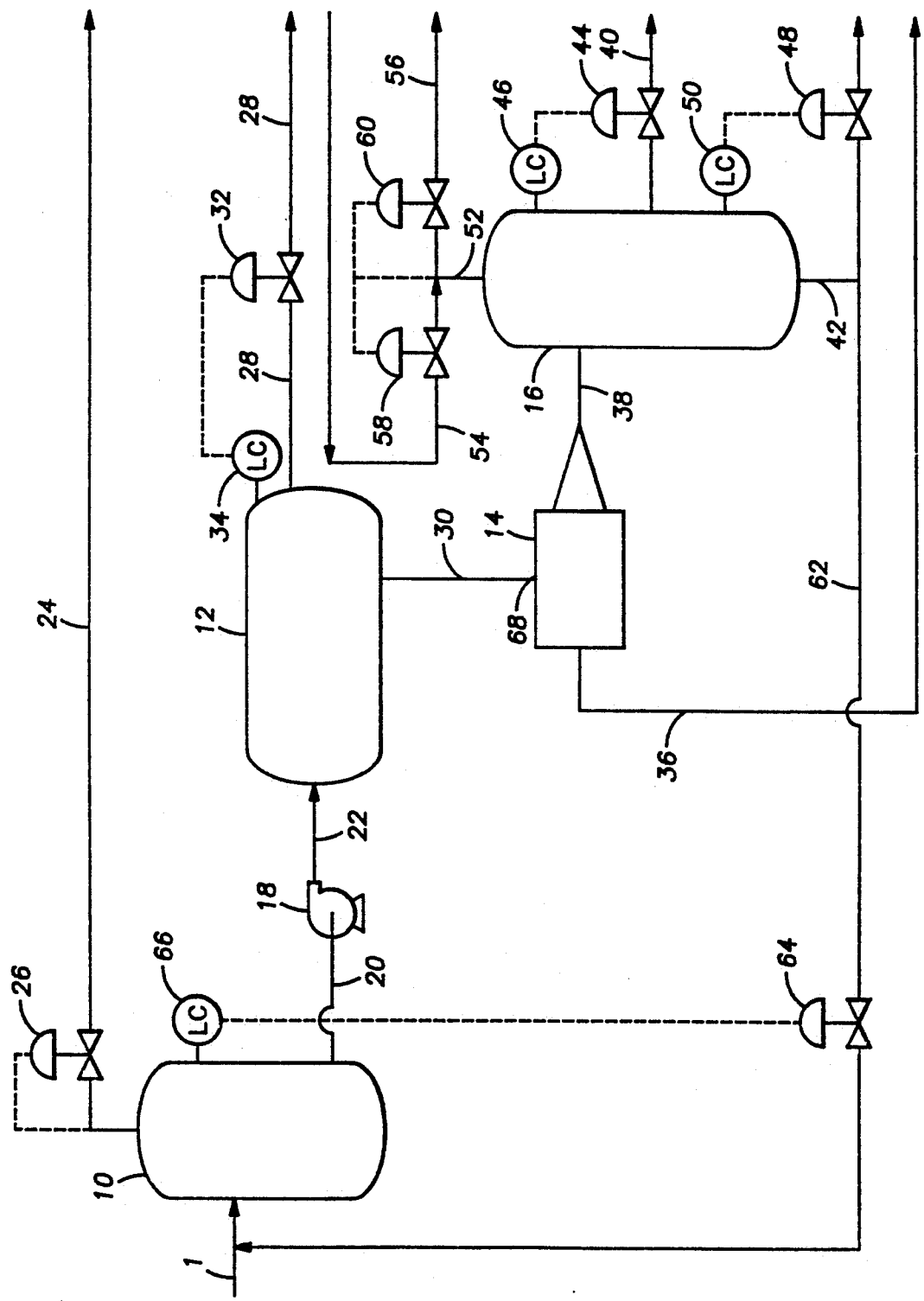
FIG. 1 is schematic view of the preferred embodiment of the apparatus of the present invention.

Referring now to FIG. 1, there is shown an apparatus for separating two immiscible liquids, such as water and oil, in accordance with the present invention. The apparatus includes a surge vessel 10, a primary separator 12, a hydrocyclone 14, a secondary separator 16, and a pump 18 for pumping a liquid from surge vessel 10 via line 20 to primary separator 12 via line 22.

Surge vessel 10 may be any suitable holding tank designed to receive and hold variable feed amounts and to provide a steady flowrate of fluid through the system. A vent line 24 having a pressure relief valve 26 is connected to surge vessel 10 for venting gas that may accumulate in surge vessel 10.

Primary separator 12 which receives fluid pumped from pump 18 is a conventional gravitational settling tank for effecting liquid/liquid phase separation. Primary separator 12 has an upper outlet 28 and a lower outlet 30 for removing therefrom the light and the heavy liquids, respectively. A level control valve 32 connected to a level controller 34 controls the flow of the separated lighter liquid out of the primary separator 12 via upper outlet 28. Lower outlet 30 flows the remaining liquid to hydrocyclone 14.

Hydrocyclone 14 is a conventional hydrocyclone having a frustoconical body with a cylindrical chamber at one end. An example of hydrocyclone 14 which is specifically designed for separation of oil from oily water is described in Coleman et al., "Hydrocyclones for Oil/Water Separation", a paper presented at the International Conference of Hydrocyclones, Oct. 1-3, 1980, and Meldrum, "Hydrocyclone: A Solution to Produced Water Treatment", Paper OTC 5594 presented at the Offshore Oil Technology Conference in Houston, Tex. on Apr. 27-30, 1987, both of which papers are incorporated herein by reference. An example of hydrocyclone 14 which is presently commercially available is the one distributed under the trade mark Vortoil ® which is available from Conoco Specialty Products, Houston, Tex. Hydrocyclone 14 has an overflow outlet 36 for flowing out the lighter fluid therefrom and an underflow outlet 38 for removing the heavier liquid therefrom. Underflow outlet 38 flows liquid to secondary separator 16.

Secondary separator 16 is preferably a conventional gravitational settling tank. Secondary separator 16 includes an upper liquid outlet 40 for removing the lighter liquid therefrom and a lower liquid outlet 42 for removing the heavier liquid therefrom. The removal of light liquid via outlet 40 is controlled by level control valve 44 which is connected to a level controller 46. Similarly, the rate of removal of the heavy liquid via outlet 42 is controlled by level control valve 48 which is connected to level controller 50. Secondary separator 16 also includes an overhead outlet line 52 which is connected to a gas blanket line 54 and a gas outlet line 56. Gas blanket line 54 provides a gas blanket for secondary separator 16. The gas blanket is controlled by valve 58. Relief valve 60 regulates the removal of vapors through gas outlet 56 to regulate the pressure or to prevent pressure buildup in secondary separator 16. A recycle line 62 is connected to lower outlet 42, upstream of level control valve 48, to provide a recycle of the heavier liquid to surge vessel 10 to maintain a steady state throughout the operation. The recycle stream through recycle line 62 is regulated by level control valve 64 which responds to a level controller 66 for controlling the level of the liquid in surge vessel 10.

The apparatus of FIG. 1 is used to separate a light liquid from a heavy liquid in streams wherein the two liquids are immiscible. The operation will now be described in connection with the separation of oil from water. It should be understood, however, that the description substantially applies to the separation of other immiscible liquids as will become apparent to one skilled in the art. Accordingly, a stream 1 comprising oil and water enters surge vessel 10. Surge vessel 10 is used to maintain a steady-state flow throughout the system. It is preferred that the flowrate of the stream through pump 18 and primary separator 12 be constant so that the hydrocyclone pressure differential required to achieve the desired degree of separation can be determined and secondary separator 16 be pressurized accordingly by the gas blanket through line 54, as described below. It should be understood, however, that although a steady flowrate is preferred through the system, the present invention is applicable to operations wherein the flowrate may vary.

Oil/water mixture from surge vessel 10 flows to pump 18 through line 20. Pump 18 pumps the mixture to a pressure which is sufficiently high to flow the mixture through the system to compensate for frictional pressure drops and to overcome the pressure drop in hydrocyclone 14 which is required to achieve the desired degree of separation at a particular flowrate. The pressurized liquid from line 22 enters primary separator 12. Moderate turbulence in line 22 and retention time in primary separator 12 allow the oil droplets which are sheared by the high energy input of pump 18 to coalesce. Accordingly, there is no need to use a special low shear pump like the one described in U.S. Pat. No. 4,844,817.

The pressurization of the liquid does not effect the separation of the phases in primary separator 12. Therein, the separation is effected by gravity forces which move the buoyant oil to the surface and the heavy water towards the bottom. Primary separator 12 is appropriately designed to provide a residence time which is sufficient to allow coalescence of droplets sheared by pump 18 and to separate a desired amount of oil from water. In a typical application, the residence time in primary separator 12 is at least three to five minutes. The oil which is the lighter fluid flows to the top and is removed therefrom through outlet 28. The remaining liquid, which includes water and oil which has not been removed in primary separator 12, flows through lower outlet 30 to hydrocyclone 14. The oil droplets in the liquid of outlet 30 are larger than the oil droplets in the liquid in line 22 downstream pump 18. The liquid from lower outlet 30 enters hydrocyclone 14. Energy from a pressure drop across hydrocyclone 14 is transferred to angular momentum of the liquids. As the liquid within hydrocyclone 14 swirls, the light phase (oil) tends to migrate toward the axis of rotation while the heavy phase (water) is urged to the maximum radius. If the pressure differential between overflow 36 and underflow 38 is properly adjusted, the relative flow rates are fixed and the liquid leaving overflow 36 contains most of the oil and some water while the liquid leaving the underflow 38 contains most of the water with a reduced amount of oil.

The water liquid flows from underflow line 38 to secondary separator 16. According to the present invention, the pressure of secondary separator 16 is equal to the outlet pressure of hydrocyclone 14 at underflow outlet 38. According to the present invention, this arrangement takes advantage of the coalescing effect of the passage through hydrocyclone 14. It is contrary to the arrangements found in the prior art wherein a pressure drop is included downstream of the hydrocyclone 14 for the purpose of affecting floatation or a similar gravity induced separation. In the prior art arrangement, the pressure drop downstream of the hydrocyclone shears the larger droplets formed in the hydrocyclone and reduces the efficiency of downstream separation systems. The elimination of the pressure drop of the present invention enhances the separation of the oil from the water in the downstream secondary separator 16. The pressure of secondary separator 16 is maintained at the same level as the pressure at the outlet of hydrocyclone 14 at underflow outlet 38 by utilziing valve 58 and 60 which increase or decrease the pressure of the gas blanket. According to the present invention, the efficiency of the separation of oil from water is substantially enhanced so that, at a residence time in secondary separator 16 on the order of one minute, the water stream exiting secondary separator 16 via outlet 42 has an oil content of less than 50 parts per million. The gas blanket in secondary separator 16 is provided by gas which is either inert, such as nitrogen, or natural gas available in the facility at higher pressure. Lines 54 and 56 may be connected to any suitable arrangement of equipment so that the gas can be recovered and recycled.

Oil recovered from outlets 28, 36 and 40 is collected, processed or disposed of by well known techniques. The water product obtained from outlet 42 is sufficiently clean for disposal in accordance with environmentally set standards.

It should be understood that the apparatus and process of the present invention are controlled so that no pressure drop is effected on the system and, more particularly, on the stream being subjected to the separation, except for the pressure drop required in hydrocyclone 14 and the nominal pressure drop due to friction or the like. The separation is more efficient than that achieved by prior art systems and avoids the need for a pressure reducing device as the one contemplated by U.S. Pat. No. 5,021,165. Accordingly, the pressure in primary separator 12 is not controlled directly; instead, it is allowed to reach its equilibrium point based on the interaction of the pump curve of pump 18 which is represented as pressure head versus flowrate and the curve of pressure drop from inlet 68 of hydrocylone 14 to outlet 36 of hydrocyclone 14 which is represented as pressure drop versus flowrate. The pump curve is chosen to make the optimum flowrate through hydrocyclone 14. That flowrate is constant and is sustained at such constant rate by means of recycle through recycle line 62 at periods of low feedrate in feed 1. The optimum flowrate through hydrocyclone 14 and, therefore, the pressure drop therethrough and the equilibrium pressure in primary separator 12 should be such that a desirable reject ratio be achieved in hydrocyclone 14, usually 1.5 to 2.0 percent. Furthermore, it should be understood that, because the pressure drop between inlet 68 and outlet 36 is always greater than the pressure drop between inlet 68 and outlet 38, the pressure at underflow outlet 38 is greater than the pressure at outlet 36. Because the pressure at secondary separator 16 is required to be substantially the same as the pressure at outlet 38 to prevent shearing of droplets caused by pressure drop, such pressure must be higher than the pressure at outlet 36, which is at least atmospheric. Accordingly, the gas blanket described above is used to maintain the pressure in secondary separator 16 above atmospheric.

Figure 2:
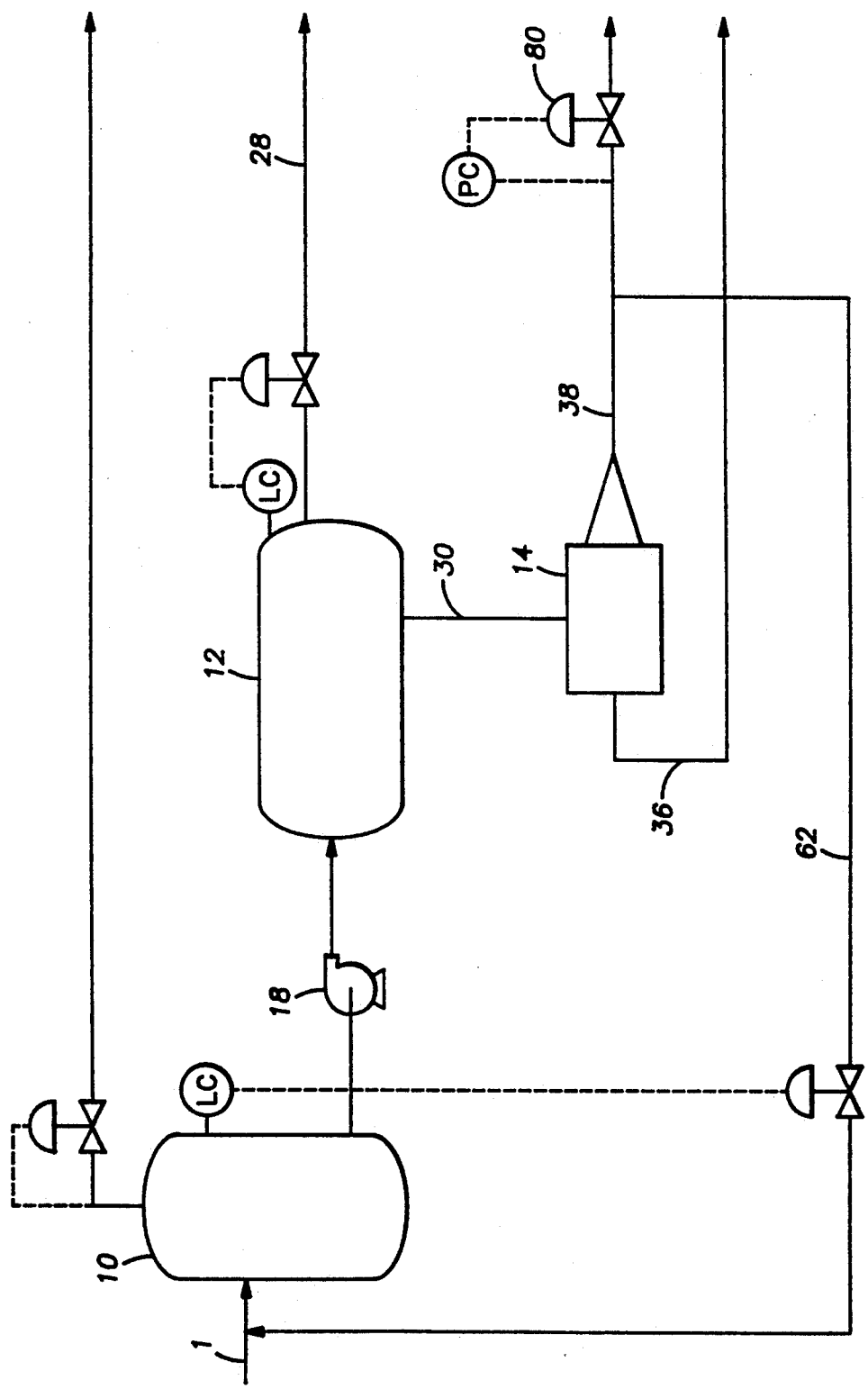
FIG. 2 is schematic view of an alternative embodiment of the apparatus of the present invention.

Referring now to FIG. 2, there is shown an alternative embodiment of the present invention. In FIG. 2, the components of the apparatus shown therein which are the same as the components of the apparatus shown in FIG. 1 are identified by the same reference numerals used to identify the same components in FIG. 1. In FIG. 2, secondary separator 16 of FIG. 1 and its auxiliary equipment are eliminated. The operation of the apparatus and process shown in FIG. 2 is the same as that described in FIG. 1 up to the point wherein the water stream leaves hydrocyclone 14 at underflow outlet 38. Accordingly, a feed 1 flows to surge vessel 10. Pump 18 pumps the oil/water mixture to primary separator 12 where coalescence occurs and oil is separated and removed via outlet 28. The remaining oil/water mixture flows via outlet 30 to hydrocyclone 14 where it is separated to an oil rich stream that exits through outlet 36 and an oil-lean water stream that exits through underflow outlet 38. Instead of flowing to a secondary separator as in FIG. 1, the water stream from underflow outlet 38 flows out of the system for disposal or the like. A backpressure valve 80 controls the pressure at underflow outlet 38 to enable the proscribed reject rate from hydrocyclone 14. Recycle stream 62 recycles water from upstream valve 80 to surge vessel 10 to maintain the desirable flowrate through the system. It should be understood that the apparatus of FIG. 2 is used when the oil removal requirements are less stringent then the requirements that necessitate the use of secondary separator 16 of FIG. 1.

Figure 3:
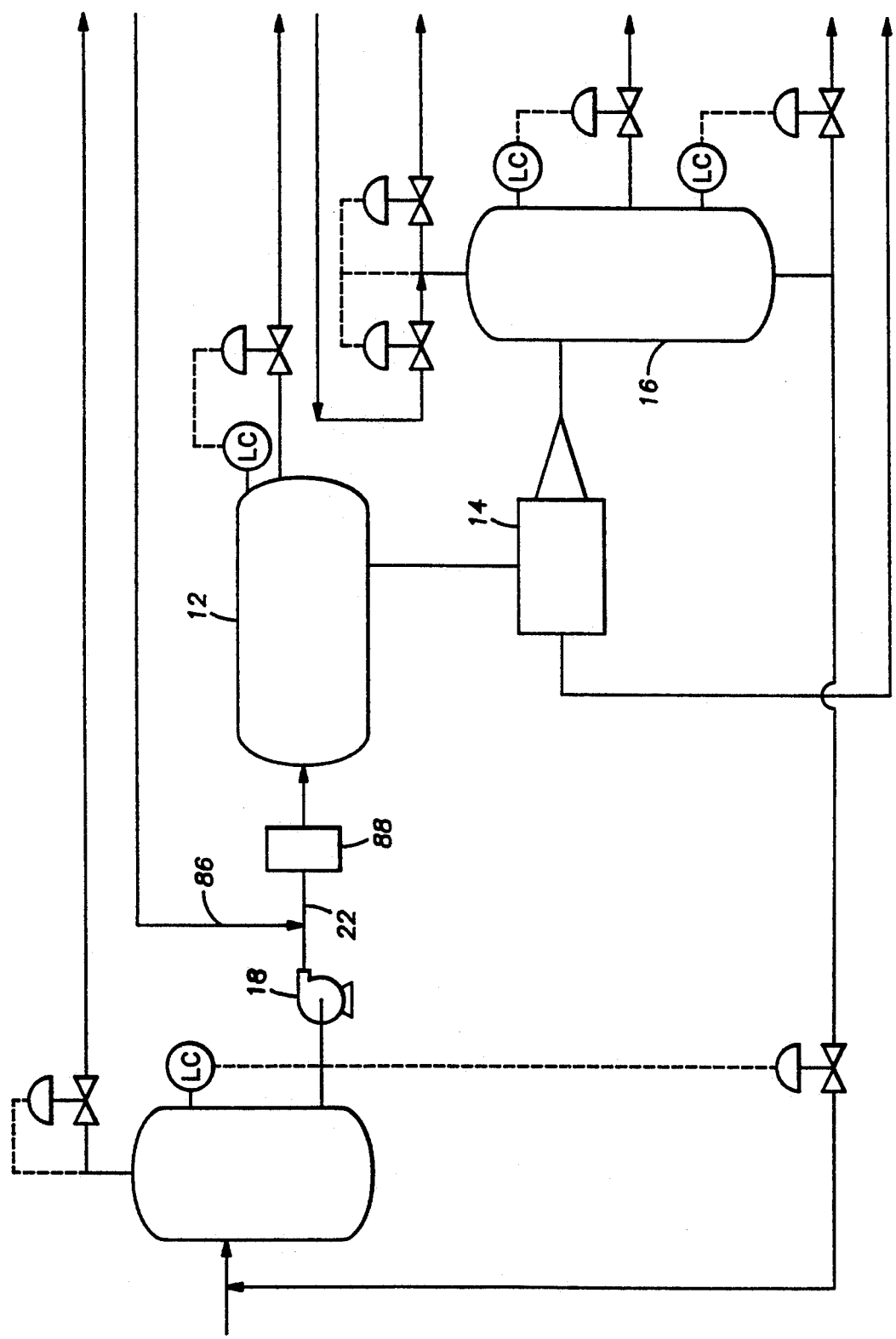
FIG. 3 is a schematic view of an alternative embodiment of the apparatus of the present invention.

Referring now to FIG. 3, there is shown still another embodiment of the present invention showing a modification to the embodiment shown in FIG. 1. More particularly, there is shown a gas inlet line 86 for introducing gas into the oil/water mixture flowing through line 22 of FIG. 1. The gas is mixed with the oil/water stream in a gas/liquid mixing means 88 such as a contact tower, an inline mixer or an apparatus such as the one disclosed in U.S. Pat. Nos. 4,935,154 and 4,983,287 to create contact between the gas and oil droplets so that flotation is effected in primary separator 12 and to aid in coalescence of oil droplets sheared by pump 18. In that case, the water is at its bubble point at the pressure in primary separator 12 and gas evolves at the lower pressure in secondary separator 16 to provide a flotation effect in secondary separator 16. The flotation effect in secondary separator 16 is provided without utilizing a pressure reducing device after hydrocyclone 14.

Figure 4:
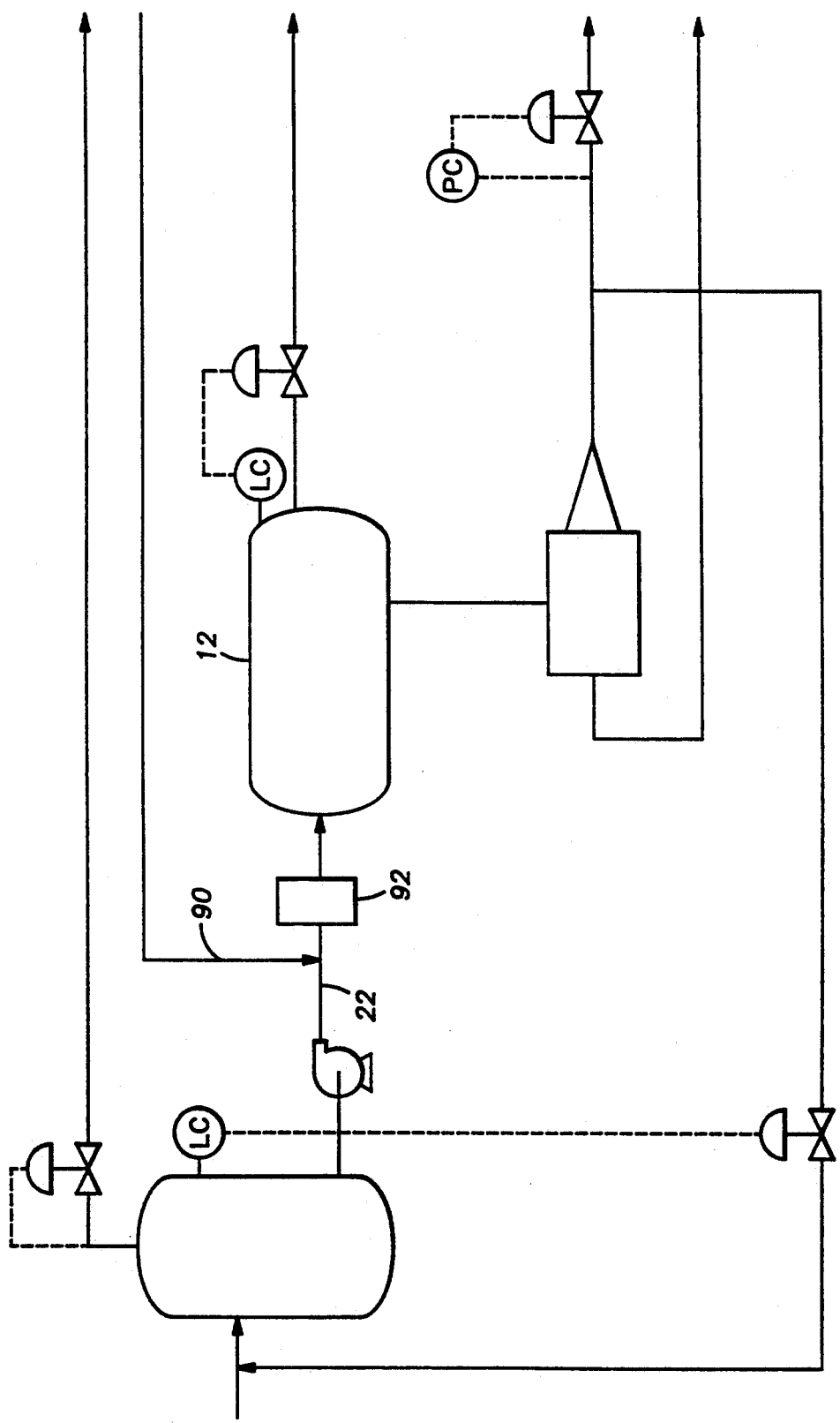
FIG. 4 is schematic view of another alternative embodiment of the apparatus of the present invention.

FIG. 4 shows another embodiment of the present invention. More particularly, there is shown a modification to the embodiment of FIG. 2 effected by providing a gas inlet line 90 for introducing gas into the oil/water mixture flowing through line 22 of FIG. 2. The gas is mixed with the oil/water stream in a gas/liquid mixing means 92 similar to the gas/liquid mixing means 88 of FIG. 3. As a result, flotation is effected in primary separator 12 and the oil droplets are coalesced.

Figure 5:
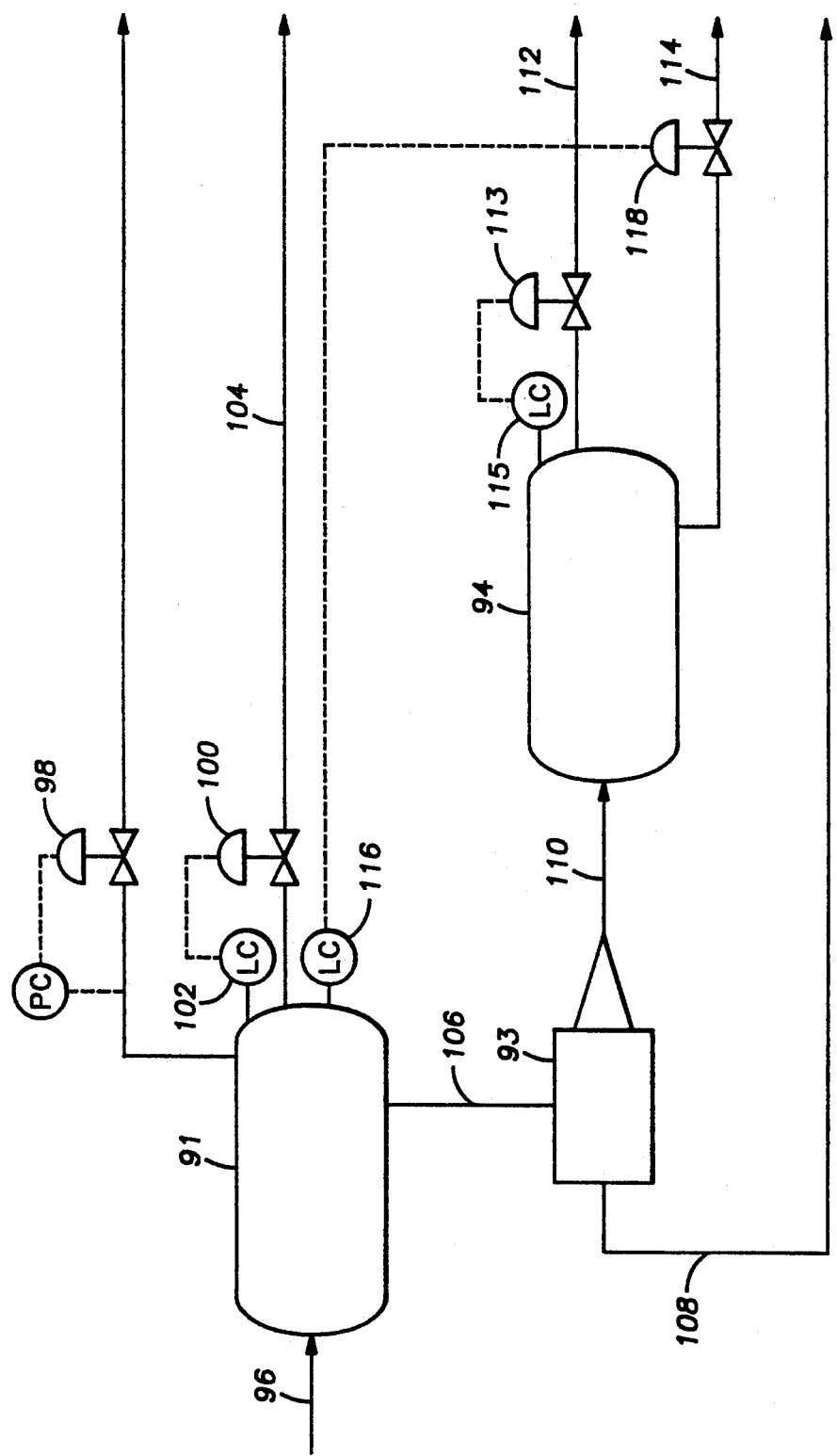
FIG. 5 is schematic view of another alternative embodiment of the apparatus of the present invention.

Still another alternative embodiment of the present invention is shown in FIG. 5. There is shown a primary separator 91, a hydrocyclone 93, and a secondary separator 94. An inlet stream 96 enters primary separator 91 which is under a pressure-controlled gas blanket which is controlled by a pressure control 98 to maintain a constant pressure within primary separator 91. Oil is separated from water and a level control valve 100 connected to a level controller 102 controls the flow of oil removal thorough a line 104. The balance of the fluid exits primary separator 91 via lower outlet 106 and flows into hydrocyclone 93. The lighter, oil-containing phase leaves hydrocyclone 93 via an overflow outlet 108 while the denser oil-lean phase leaves via an underflow line 110. Underflow line 110 feeds secondary separator 94. Therein, oil is separated from water. The lighter oil is removed via upper outlet 112 and the heavier water is removed via lower outlet 114. A level control valve 113 controlled by level controller 115 regulates the flow of oil through upper outlet 112. A level controller 116 in primary separator 91 controls a level control valve 118 to regulate the flow of water through outlet 114. The process controls are arranged to minimize pressure reduction between hydrocyclone 93 and secondary separator 94, so that the benefit of the enhanced coalescence resulting from passage through hydrocyclone 93 can be realized.

In each of the embodiments, coalescence and separation of the oil droplets is encouraged while turbulence and shear that would impair coalescence is minimized. Therefore, pressure drop is minimized and devices which cause shearing of the droplets are avoided as much as possible.

While preferred embodiments of the invention have been shown and described, modifications thereof can be made by one skilled in the art without departing from the spirit of the invention.

What is claimed is:

1. A method of reducing the concentration of a first liquid in a mixture containing the first liquid and a second liquid which is immiscible with the first liquid, comprising the steps of:

first separating a first portion of the first liquid by gravity or flotation from the mixture in a primary separator to form a remaining mixture;

flowing the remaining mixture to a hydrocyclone;

second separating a second portion of the first liquid from the remaining mixture in the hydrocyclone to form a second remaining mixture;

removing from the hydrocyclone the second portion of the first liquid through an overflow outlet at a first pressure and the second remaining mixture through an under flow outlet at a second pressure that is higher than said first pressure and is at least atmospheric; and third separating a third portion of the first liquid from the second remaining mixture in a secondary separator to form a third remaining mixture without reducing the pressure of the second remaining mixture from the second pressure wherein said third separation is carried out at a pressure approximately equal to said second pressure and coalesced droplets of said first liquid that are present in said second remaining mixture are not subject to shear.

2. The method according to claim 1 wherein the second pressure is maintained at a level so that the first pressure is at least atmospheric.

3. The method according to claim 1 further including the step of controlling the pressure of the first separating step.

4. The method according to claim 1 further including the step of mixing the mixture with a gas prior to the first separating step.

5. The method according to claim 1 wherein the first separating step is carried out under a pressure maintained at a predetermined level.

6. The method according to claim 1 further including the step of recycling a portion of the third remaining mixture to the first separating step.

7. The method according to claim 1 further including the step of raising the pressure of the mixture prior to the first separating step.

8. The method according to claim 7 wherein the raising step includes the step of pumping the mixture.

9. The method according to claim 8 further including the step of coalescing the first liquid after the pumping step.

10. The method according to claim 1 further including the step of accumulating the mixture in a surge vessel prior to the first separating step.

* * * * *